Dec. 12, 1933.   A. W. ALTVATER   1,938,678
MACHINE FOR CUTTING, TRIMMING, AND ORNAMENTING SHOE PARTS
Filed May 20, 1932   4 Sheets-Sheet 1

Inventor
Arthur W. Altvater
by Rippey & Kingsland
His Attorneys.

Dec. 12, 1933.  A. W. ALTVATER  1,938,678
MACHINE FOR CUTTING, TRIMMING, AND ORNAMENTING SHOE PARTS
Filed May 20, 1932  4 Sheets-Sheet 2
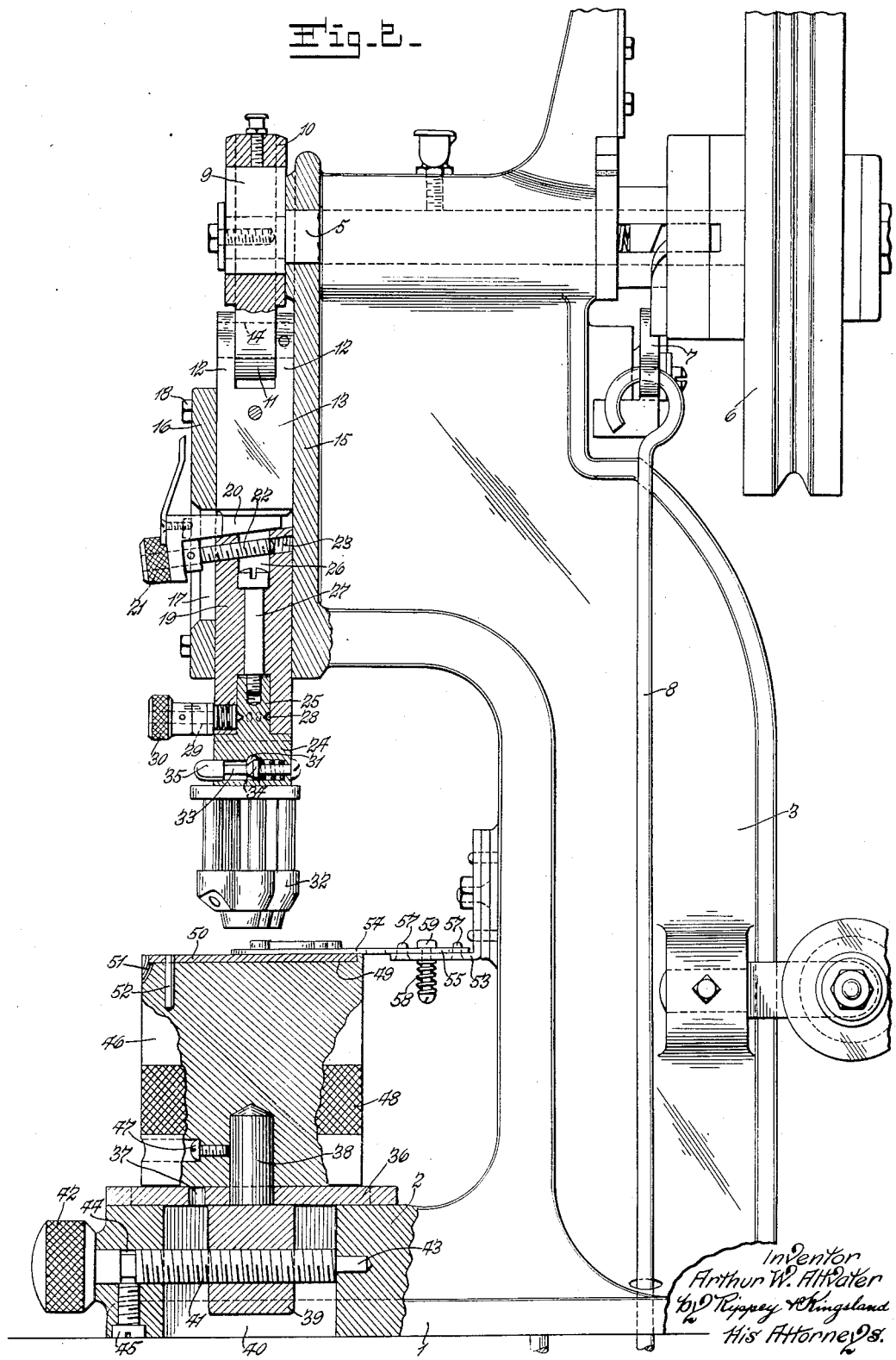

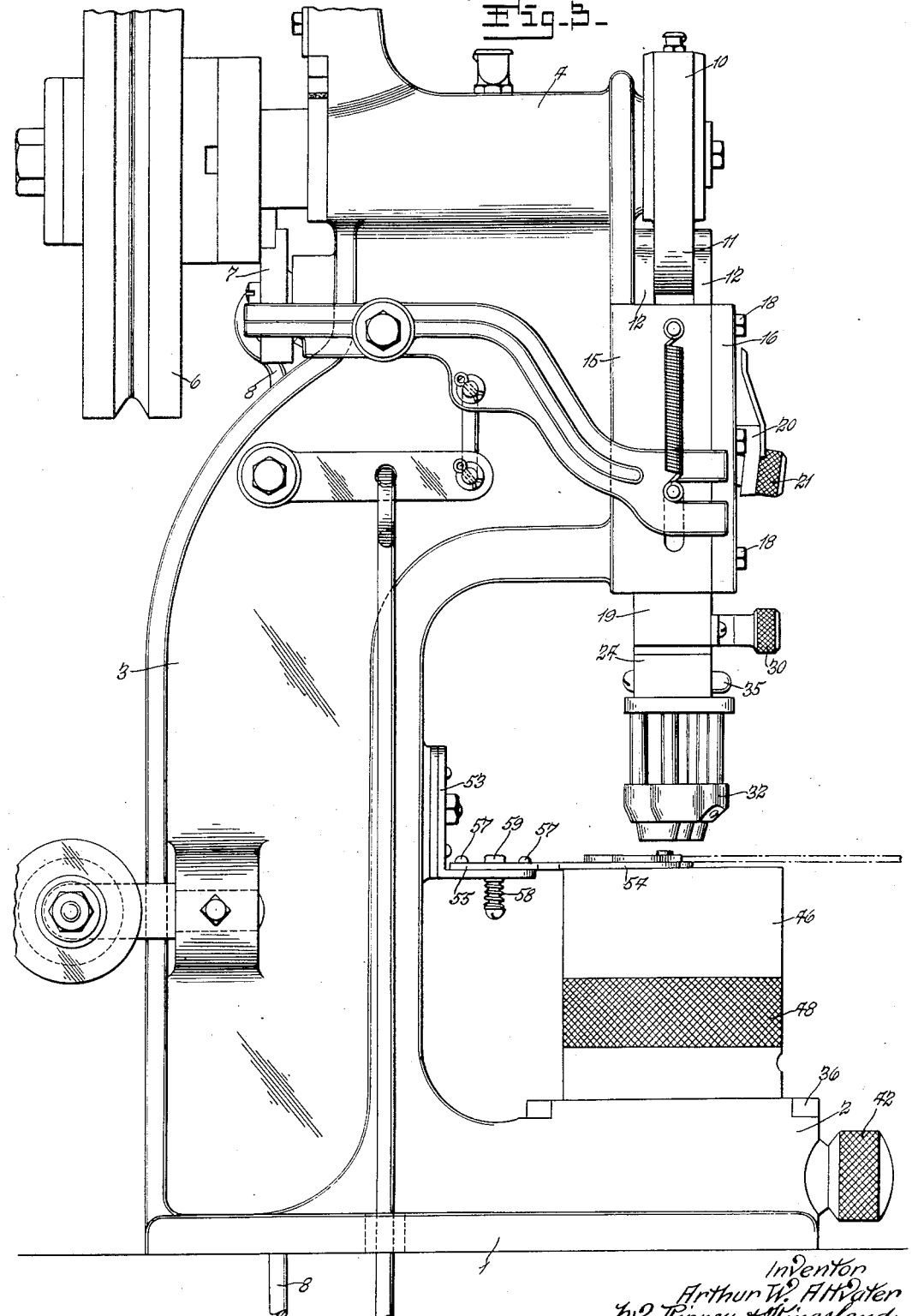

Dec. 12, 1933.  A. W. ALTVATER  1,938,678
MACHINE FOR CUTTING, TRIMMING, AND ORNAMENTING SHOE PARTS
Filed May 20, 1932  4 Sheets-Sheet 4
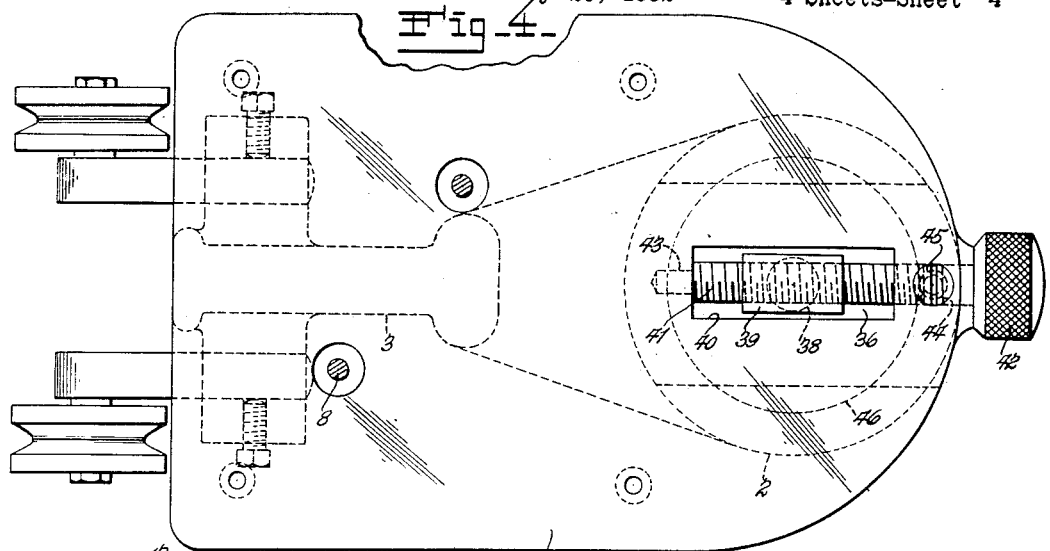
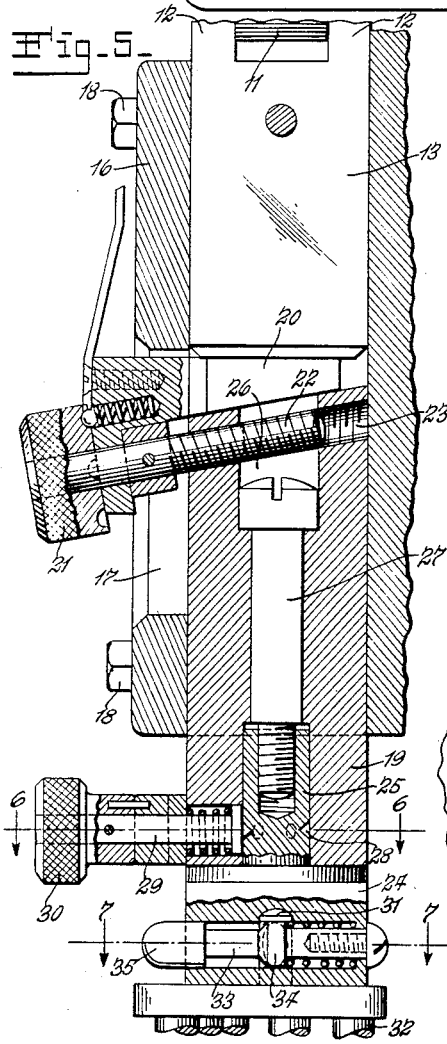
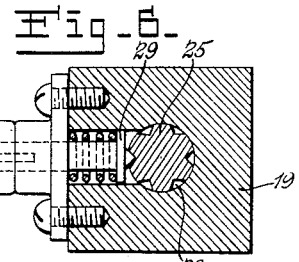
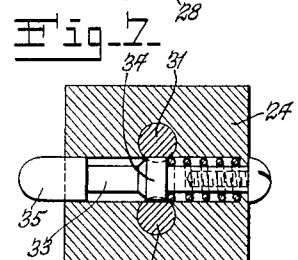
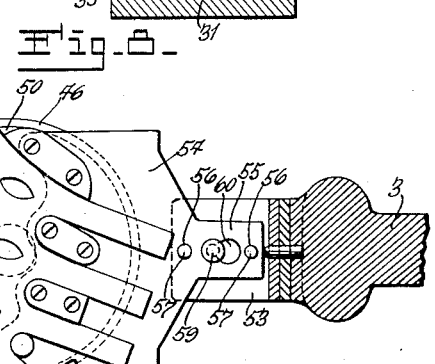

Patented Dec. 12, 1933

1,938,678

UNITED STATES PATENT OFFICE 1,938,678

MACHINE FOR CUTTING, TRIMMING, AND ORNAMENTING SHOE PARTS

Arthur W. Altvater, University City, Mo.

Application May 20, 1932. Serial No. 612,431

14 Claims. (Cl. 164—93)

This invention relates to improvements in machines for cutting, trimming and ornamenting shoe parts; and consists in the novel construction hereinafter disclosed.

This invention relates to improvements in a machine of the type disclosed in my Patent No. 1,834,919, dated December 8, 1931, which is a machine adapted to form cut-outs in flat work, completed shoe uppers, and also for trimming lined cut-outs in completed shoe uppers or completed shoes.

The features of the present invention that present novelty over the construction shown and described in my aforesaid patent are directed primarily to the construction of a machine of the general type there disclosed including an improved form of work support equipped with a striking plate, the work support being designed to receive flat work, closed shoe uppers and finished shoes. An important feature of the work support is that it is designed to be preliminarily adjusted so that the working surface of the striking plate may be changed in respect of the cutting edges of the dies in order to present unindented surfaces of the striking plate in cooperative relation with the cutting edges of the die.

Another important feature of improvement incorporated in the machine of the present invention includes a provision for circumferentially adjusting the shank of the die in respect of the die carrier so that the cutting edges of the die may be angularly adjusted with respect to the work.

Additional improvements over the disclosure of my aforesaid prior patent will be readily understood from the following detail description, taken in connection with the accompanying drawings, in which—

Fig. 2 is a side elevation of the machine likewise with parts being shown in section to more fully illustrate the invention.

Fig. 3 is a side elevation of the side of the machine opposite to that shown in Fig. 2.

Fig. 4 is a bottom plan view of the machine, part of the structure being indicated in dotted lines.

Fig. 5 is an enlarged sectional view of parts of the die operating mechanism.

Fig. 6 is a cross-section on the line 6—6 of Fig. 5.

Fig. 7 is a cross-section on the line 7—7 of Fig. 5.

Fig. 8 is a plan view of a part of the machine particularly illustrating the gage plate and its association with the machine.

Figure 1:
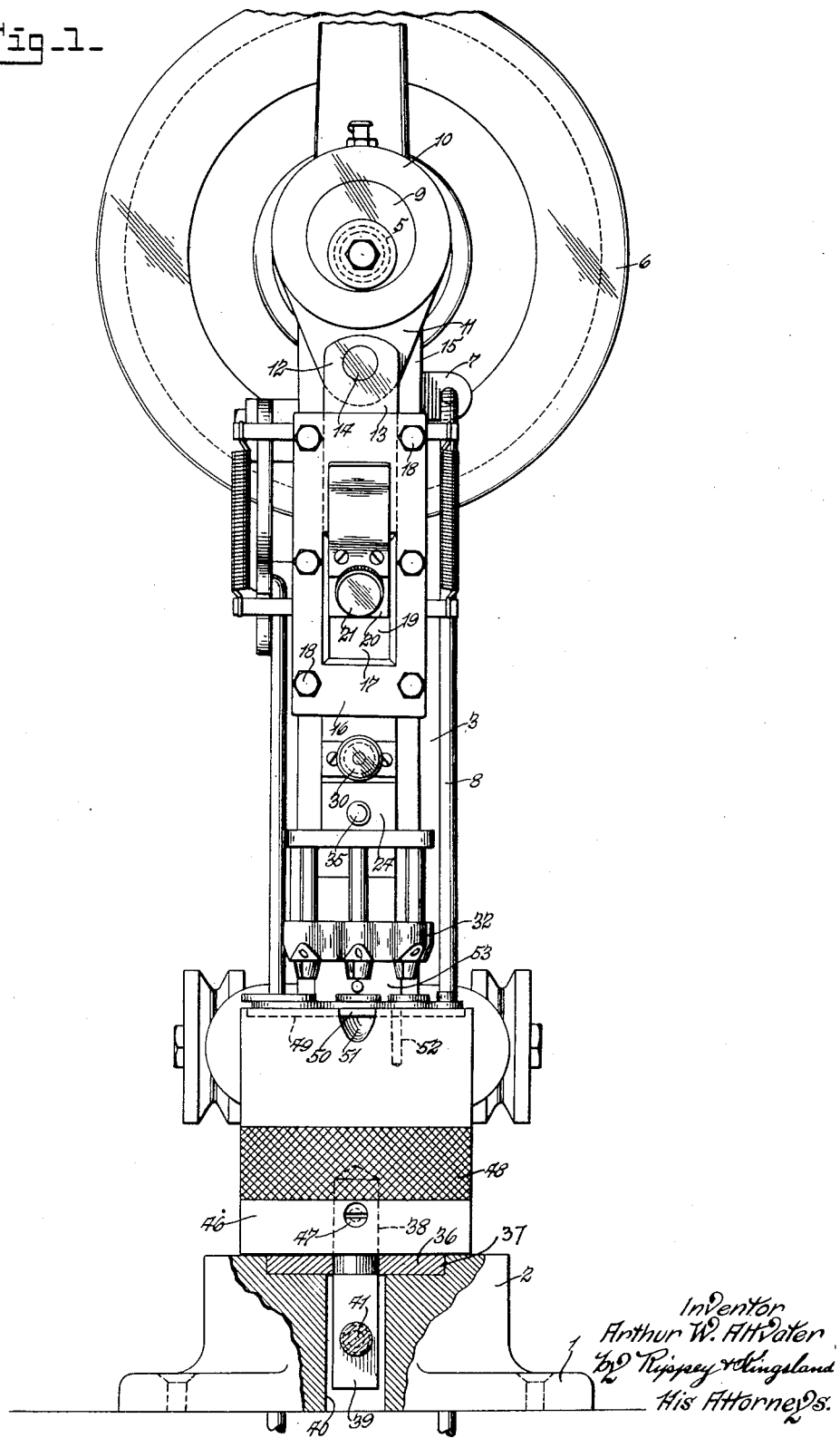
Fig. 1 is a front elevation of the machine, certain of the parts being in section to more fully disclose the construction.

In the embodiment of the invention illustrated in the drawings, the frame of the machine is shown as including a base 1 which is adapted to be rigidly secured to a permanent horizontal support. Integrally formed with the base is an irregularly shaped boss 2 constituting a support for the work support. An overhanging arm is integrally cast with the base 1 and includes the upright or standard 3 and the overhanging head 4. In the upper part of the frame of the machine is a journal in which a shaft 5 is supported. The shaft 5 is operatively connected for intermittent rotation with a constantly driven pulley 6 which obtains power from any suitable source.

Between the pulley 6 and the shaft 5 is a clutch mechanism 7 controlled by a link 8. The clutch construction is generally of a design employed in the machine of my prior Patent No. 1,807,952, dated June 2, 1931, which is referred to and described in my prior Patent No. 1,834,919 at page 2, lines 32 et seq. Since the construction and operation may be readily ascertained by reference to my prior patents, it is unnecessary to repeat the description of the construction and operation of the clutch device except to direct attention to the fact that the shaft 5 is intermittently operated.

The shaft 5 carries at its front end an eccentric 9 which rotates within a ring 10, said ring being provided with a downwardly extending arm 11. The arm 11 is reciprocated vertically by the rotation of the eccentric 9 within the ring 10 when the shaft 5 is rotated. The arm 11 extends between a pair of spaced arms 12 formed as upward extensions of a sliding plunger 13. A pin 14 provides a pivot connection between the arm 11 and the arms 12. The plunger 13 is mounted in a guideway formed in an extension 15 projecting forwardly from the front face of the overhanging arm 4. A plate 16 having a central rectangular cut-out portion 17 is attached to the walls of the guideway by screws 18. A die carrier in the form of a sliding block 19 is mounted in the lower part of the guideway in axial alinement with the plunger 13.

In order to adjust the effective length of the die carrier so that its vertical movement may be regulated to accommodate the machine for different thicknesses of work, a connection in the form of a wedge-block 20 is interposed between the lower face of the plunger 13 and the upper face of the die carrier. The upper face of the die carrier inclines downwardly and forwardly and constitutes an inclined seat for the lower inclined face of the block 20. The adjustment of the block 20 is effected by the manipulation of a knob or handle 21, which threads a screw 22 into and out of a threaded inclined opening 23 in the die carrier. The connection between the plunger and the die carrier is generally the same in construction and operation as the connection shown in my prior Patent No. 1,834,919, so that it is unnecessary to repeat that description. Suffice it is to call attention to the fact that, by the manipulation of the handle 21, the effective length of the stroke of the plunger 13 is controlled, thereby controlling the vertical movement of the die carrier.

The die carrier, in addition to the block 19, includes a rotary adjustable head 24 that has a cylindrical stud 25 extending upwardly from its top face. The stud 25 seats in a cylindrical recess extending into the lower face of the block 19. The block 19 has an axial opening therethrough which is enlarged at its upper end to form a cylindrical recess 26, and a screw 27 extends through the axial recess in the block, the head of the screw 27 seating in the recess 26, and the lower threaded portion of the screw 27 being threaded into the upper face of the stud 25. The stud 25 carries in its cylindrical wall a circular series of notches 28 which are cooperatively related with a spring-pressed pin 29 extending through the front face of the block 19, said pin 29 being axially movable by means of a handle 30, the construction being such that the pin may be withdrawn from the notches 28 and held out of engagement therewith when the handle 30 is in one adjustment and will be moved axially inwardly so that the inner end of the pin 29 engages in a corresponding notch 28 when in another adjustment. Thus, the head 24 may be circumferentially adjusted in respect of the block 29 and latched in predetermined adjustments by engagement of the head of the pin 29 with selected ones of the notches 28. The head 24 has in its underface spaced parallel openings that constitute sockets for studs 31 for supporting the die 32.

A latch device including a stem 33 having an intermediate circumferential flange 34 is supported in a recess in the head 24, and is adapted to be moved longitudinally manually by engagement with a head 35 that extends outwardly of the head 24. The details of the latch construction for latching the die removably in position in the die carrier head is substantially the same construction as utilized in the construction of my prior Patent No. 1,834,919, so that a repetition of a description of the construction is unnecessary. It should be noted, however, that, in the present construction, the die is carried by the circumferentially adjustable head of the die carrier, so that the angular position of the die may be changed by the operator; and that provision is made for latching the head of the die carrier in selected circumferential adjustments.

The novel form of work support includes a sliding plate 36 mounted in a recess 37 in the top face of the boss 2. The plate 36 carries an upwardly extending stud shaft 38 and a depending lug 39. In the bottom of the base 1 is a rectangular recess 40 into which the lug 39 extends. Projecting inwardly from the front face of the boss 2 is a screw 41 having a knob or handle 42 at its front end and a reduced extension 43 at its inner end. The extension 43 seats in a recess extending inwardly from the rear wall forming the recess 40. The lug 39 has a longitudinal threaded opening therethrough through which the screw 41 extends. Adjacent to the forward end of the screw is a circumferential recess 44 into which the end of a screw 45 extends, said screw 45 being threaded into the lower face of the base 1. This construction prevents longitudinal movement of the screw 41 and provides for the rotation thereof, thereby moving the plate 36 longitudinally in the recess 37, changing the axial position of the stud shaft 38 in respect of the axis of the die 32. The work support in the form of a cylindrical member 46 is mounted on the stud shaft 38, the lower face being slidable across the upper face of the boss 2 as the plate 36 is adjusted longitudinally in the recess 37.

The lower face of the member 46 has a cylindrical recess therein, permitting the seating of the stud shaft 38 in the recess so that the member 46 may be circumferentially adjusted around the stud shaft 38 and, if desired, locked in position with respect to said shaft by a set-screw 47. In order to effect the manual rotation of the member 46, it may be provided with a circumferential knurled band 48 for convenient manual engagement.

The upper face of the member 46 is formed with a circular shallow recess 49 in which is mounted a circular plate 50. Said plate 50 is formed from a relatively soft material with respect to the material forming the cutting edge of the die. For example, relatively soft sheet brass may be employed as the material from which the plate 50 is formed. The member 46 is preferably provided with a thumb notch 51 extending into the circumference of the recess 49, so that the edge of the plate 50 may be engaged to remove it from its seat in the recess 49. The plate may also, if desired, be provided with a pin 52 which extends into an opening formed in the bottom of the recess 49, thereby preventing circumferential movement of the plate 50 in the recess 49.

By reference to the construction just described, it will be understood that the cutting edge of the die, after passing through the work, strikes the plate 50 with a relatively high degree of force, indenting the struck surface, but that, with the construction described, the contacting surface of the plate 50 may be changed both by moving the plate transversely of the cutting edge of the die by manipulation of the handle 42, and also circumferentially in respect thereof by revolving the member 46 on the stud shaft 38. In addition, by adjusting the angular position of the die by manipulation of the head 24, the cutting edges of the die may be moved out of registration with previously formed indentations in the plate 50. Thus, it will be unnecessary to renew the plate 50 except at intervals after a relatively long operation of the machine. It will also be understood that the plate 50 may be renewed without difficulty and at relatively small expense. It should also be noted that the plate 50 may be reversed by providing for the relative movement of the pin 52 in the plate 50.

In order that the work support may be adjusted independently of the means for gaging the work, the machine is equipped with a gage support carried by the frame of the machine and independent of the work support. The support for the gage plate includes an angle bracket 53 having its vertical leg attached to the front face of the member 3 and its horizontal leg extending inwardly toward the work support. The gage plate 54 is provided with an extension 55 that has openings 56 arranged to seat over studs 57 projecting upwardly from the horizontal leg of the angle bracket 53. A spring-pressed latch pin 58 is carried by the horizontal leg of the angle bracket 53 and the head 59 thereof interlocks into a notched opening 60 through the extension 55 of the gage plate. The gage plate is thus removably connected with the machine so that it may be coordinated with the work support for guiding the work in relation to the die. Since the gage plate is independently supported by a rigid part of the machine, it may be accurately adjusted in respect to the die without interfering with the adjustment of the work.

In the operation of the machine, the die carrier may be depressed so as to contact with the upper surface of the work placed on the work support in a position determined by the gage plate, and then the machine operated to drive the die through the work and into contact with the striking plate 50. In certain classes of work it will be unnecessary to use the gage plate, and the die may be positioned preliminarily in respect of formed cut-outs or other guiding perforations through the work, and then the machine operated to drive the die through the work. In certain classes of trimming operations, the machine is specially effective, as the die may be positioned through the cut-outs and the die then driven through the relatively thin lining material, making a clean cut around the cut-out openings because of the ability to provide an unindented striking surface as a backing for the lining.

When the machine is operated without the use of a gage plate, it is convenient, in certain classes of operations, to circumferentially adjust the work support after the initial positioning of the die in respect of the work. Also, in certain cutting operations, the operation of the machine is facilitated by changing the angle of the die in respect of the work, which is made possible by mounting the die in the rotary adjustable head. The feature of the angular adjustment of the die is, therefore, not only an advantage from an operating standpoint, but also from the standpoint of exending the possibility of the relative adjustment of the cutting edge of the die in respect of the surface of the striking plate.

I am aware that the invention may be modified in numerous particulars without departing from the spirit and scope thereof. I do not limit myself, therefore, to the exact construction shown and described, but what I claim and desire to secure by Letters Patent is:—

1. In a machine of the character described including a plunger, a die carrier movable independently of the plunger to contact position with the work, the combination with a die carried by said die carrier, of a work support, a striking plate carried by said support, means for circumferentially adjusting the work support in respect to the die to change the area of the striking plate that registers with the die, and means for operating the plunger to drive the die through the work and against the striking plate.

2. In a machine of the character described including a plunger, a die carrier movable independently of the plunger to contact position with the work, the combination with a die carried by said die carrier, of a work support, a striking plate removably mounted in the work support and in cooperative relation with the die, means for circumferentially adjusting the work support to change the area of the striking plate that registers with the die, and means for operating the plunger to drive the die through the work and against said striking plate.

3. In a machine of the character described, the combination with a plunger, a reciprocating element cooperatively related with said plunger and a revoluble head supported by said reciprocating element, of a die carried by said revoluble head, means for locking said revoluble head in selected circumferential adjustments, a work support, means for adjusting the work support circumferentially in respect to the die, a striking plate carried by said work support, and means for reciprocating the plunger to move the die to and from the striking plate.

4. In a machine of the character described, the combination of a plunger, a die carrier in operative relation with the plunger, a revoluble support for the die, means for locking said support in selected circumferential positions, a die carried by said die support, a work support, a striking plate carried by said work support, an adjustable support for said work support whereby said work support may be adjusted circumferentially in respect to the die, and means for operating the plunger to drive the die through the work.

5. In a machine of the character described, the combination of a plunger, a die carrier including a reciprocating block cooperatively related to the plunger and a revoluble head carried by said block, with a die carried by said head, means for latching said head in selected angular adjustments, a work support, a striking plate removably seated in the work support, and means for operating the plunger to reciprocate the die into and out of contact with said striking plate.

6. In a machine of the character described, the combination with a frame, of a plunger mounted for vertical reciprocation in the frame, a vertically reciprocating cutting die cooperatively related to the plunger, a work support carried by the frame and presenting a work supporting surface in a plane parallel with the cutting edge of the die, means for adjusting said work support endwise with respect to the die, and means for adjusting the work support circumferentially in any endwise adjustment thereof.

7. In a machine of the character described, the combination of a frame, a vertically reciprocating die carrier mounted in the frame, a die supported by said die carrier, means for reciprocating the die carrier, a sliding plate mounted below the die carrier and movable across the axis of the die carrier, a work support carried by said plate, and manual means for adjusting the plate.

8. In a machine of the character described, the combination of a frame, a vertically reciprocating die carrier mounted in the frame, a die supported by said die carrier, means for reciprocating the die carrier, a sliding plate mounted below the die carrier and movable across the axis of the die carrier, a work support carried by said plate, manual means for adjusting the plate, and a circumferentially adjustable connection between the work support and said plate.

9. In a machine of the character described including a frame comprising a base plate and an overhanging arm, a reciprocating die support in said overhanging arm, a die carried by said support, means for reciprocating said support, a sliding plate movable endwise mounted in the base below said die support, manual means for adjusting said plate, a work support revolubly supported on said plate, and means for locking said work support against rotary movement in respect of said plate.

10. In a machine of the character described including a frame comprising a base plate and an overhanging arm, a reciprocating die support in said overhanging arm, a die carried by said support, means for reciprocating said support, a sliding plate movable endwise mounted in the base below said die support, manual means for adjusting said plate, a work support revolubly supported on said plate, means for locking said work support against rotary movement in respect of said plate, a guide plate support carried by the frame, and a guide plate removably supported in said support and extending across the working surface of said work support.

11. In a machine of the character described including a frame comprising a base plate and an overhanging arm, a reciprocating die support in said overhanging arm, a die carried by said support, means for reciprocating said support, a sliding plate movable endwise mounted in the base below said die support, manual means for adjusting said plate, a work support revolubly supported on said plate, means for locking said work support against rotary movement in respect of said plate, a guide plate support carried by the frame, a guide plate removably supported in said support and extending across the working surface of said work support, and a striking plate carried by the work support below said guide plate.

12. In a machine of the character described, a frame, a die carrier mounted for vertical reciprocating movement in the frame, a die, a circumferentially adjustable connection between the die and said die carrier, means for locking said connection against movement, a work support, a slidable connection between the work support and the frame, said work support having a working surface parallel with the cutting edges of the die, and a striking plate removably mounted in said work support.

13. In a machine of the character described, a frame, a die carrier mounted in the frame and vertically reciprocating therein, means for reciprocating said die carrier, a work support mounted below said die carrier, a connection between the work support and the frame whereby the work support may be adjusted circumferentially, and means for locking said work support in selected circumferential adjustments.

14. In a machine of the class described, the combination with a reciprocating die carrier, of a work support movable across the axis of the die carrier and having a recess in the wall thereof adjacent to the die carrier, an actuator for moving said work support, and a striking plate seated in the recess in said work support.

ARTHUR W. ALTVATER.